(12) United States Patent
Klouzal et al.

(10) Patent No.: US 12,405,665 B2
(45) Date of Patent: Sep. 2, 2025

(54) METHOD AND APPARATUS FOR ENTRAINING SIGNALS

(71) Applicant: Robert J. Plotke, Simi Valley, CA (US)

(72) Inventors: Theodore J. Klouzal, Chatsworth, CA (US); Robert J. Plotke, Simi Valley, CA (US)

(73) Assignee: Robert J. Plotke, Simi Valley, CA (US)

( * ) Notice: Subject to any disclaimer, the term of this patent is extended or adjusted under 35 U.S.C. 154(b) by 586 days.

(21) Appl. No.: 18/046,454

(22) Filed: Oct. 13, 2022

(65) Prior Publication Data
US 2023/0125806 A1    Apr. 27, 2023

Related U.S. Application Data

(60) Provisional application No. 63/262,871, filed on Oct. 21, 2021.

(51) Int. Cl.
*G06F 3/01*    (2006.01)
(52) U.S. Cl.
CPC ..................... *G06F 3/015* (2013.01)
(58) Field of Classification Search
CPC ....................................................... G06F 3/015
See application file for complete search history.

(56) References Cited

U.S. PATENT DOCUMENTS

| 5,574,369 A | 11/1996 | Hibbs |
| 5,724,188 A | 3/1998 | Kumagai et al. |
| 5,830,064 A | 11/1998 | Bradish et al. |
| 6,008,642 A | 12/1999 | Bulsara et al. |
| 6,024,700 A | 2/2000 | Nemirovski et al. |
| 6,070,178 A | 5/2000 | Anderson et al. |
| 6,188,294 B1 | 2/2001 | Ryan et al. |
| 6,249,009 B1 | 6/2001 | Kim et al. |
| 6,324,558 B1 | 11/2001 | Wilber |
| 6,762,605 B2 | 7/2004 | Brinker et al. |
| 6,763,364 B1 | 7/2004 | Wilber |
| 6,780,589 B1 | 8/2004 | Gulati |

(Continued)

FOREIGN PATENT DOCUMENTS

| JP | 7204352 | 8/1995 |
| WO | 00/03639 | 1/2000 |

(Continued)

OTHER PUBLICATIONS

International Preliminary Report on Patentability for International Application PCT/US2018/035184, Report issued Dec. 3, 2019, Mailed Dec. 12, 2019, 08 Pgs.

(Continued)

*Primary Examiner* — David E Choi

(57) ABSTRACT

Methods and apparatus configured to allow for users to intentionally interface with an external signal are provided. The methods and apparatus incorporate a randomly-generated plasma signal the behavior of which may be influenced to provide a control output. The methods and apparatus provide a temporal coherence measure influenced by a user that improves the ability to discriminate between intentionality and non-intentionality, and allow for the control of switching, communication, feedback and mechanical movement.

20 Claims, 14 Drawing Sheets

(56) References Cited

U.S. PATENT DOCUMENTS

| | | | |
|---|---|---|---|
| RE44,097 E | 3/2013 | Wilber et al. | |
| 8,423,297 B2 | 4/2013 | Wilber | |
| 9,477,443 B1 | 10/2016 | Belinski | |
| 9,628,054 B1 | 4/2017 | Chen et al. | |
| 9,858,041 B2 | 1/2018 | Valentino et al. | |
| 11,181,981 B2 | 11/2021 | Klouzal et al. | |
| 2003/0219119 A1 | 11/2003 | Kocarev et al. | |
| 2004/0139132 A1 | 7/2004 | Lutkenhaus et al. | |
| 2006/0234546 A1* | 10/2006 | Mori | H04B 3/36 348/E9.053 |
| 2007/0011217 A1 | 1/2007 | Kim | |
| 2008/0183314 A1 | 7/2008 | Klouzal et al. | |
| 2009/0308734 A1* | 12/2009 | Krauss | H01J 37/32935 204/298.03 |
| 2010/0090539 A1* | 4/2010 | Auchterlonie | H05H 1/46 307/106 |
| 2010/0127756 A1 | 5/2010 | Balboni | |
| 2010/0137734 A1 | 6/2010 | Digiovanna et al. | |
| 2012/0271580 A1* | 10/2012 | Bartling | G06F 3/044 702/65 |
| 2012/0294625 A1 | 11/2012 | Dynes et al. | |
| 2013/0036078 A9 | 2/2013 | Wilber | |
| 2014/0152189 A1* | 6/2014 | Gilmore | H01J 37/32183 315/224 |
| 2014/0197865 A1 | 7/2014 | Feng et al. | |
| 2015/0069911 A1* | 3/2015 | Nettesheim | B23K 10/00 315/111.21 |
| 2016/0117149 A1 | 4/2016 | Caron et al. | |
| 2016/0256629 A1* | 9/2016 | Grosman | G16Z 99/00 |
| 2016/0328211 A1 | 11/2016 | Nordholt et al. | |
| 2017/0372873 A1* | 12/2017 | Yamada | H01J 37/32183 |
| 2018/0348864 A1 | 12/2018 | Klouzal et al. | |
| 2019/0073030 A1 | 3/2019 | Lee et al. | |
| 2019/0348813 A1* | 11/2019 | Johnson | H01S 5/18361 |
| 2020/0335305 A1* | 10/2020 | Long | H03K 4/92 |
| 2023/0125806 A1* | 4/2023 | Klouzal | G06F 3/015 700/83 |

FOREIGN PATENT DOCUMENTS

| | | |
|---|---|---|
| WO | 02/073386 A1 | 9/2002 |
| WO | 03/073175 A2 | 9/2003 |
| WO | 2018222747 A1 | 12/2018 |
| WO | 2023069866 A1 | 4/2023 |

OTHER PUBLICATIONS

International Preliminary Report on Patentability for International Application PCT/US2022/078072, Report issued Apr. 23, 2024, Mailed on May 2, 2024, 4 Pgs.
International Search Report and Written Opinion for International Application No. PCT/US2022/078072, Search completed Dec. 16, 2022, Mailed Jan. 9, 2023, 12 Pgs.
International Search Report and Written Opinion for International Application No. PCT/US2018/035184, Search completed Jul. 24, 2018, Mailed Aug. 9, 2018, 9 Pgs.
Capra, F., "The Tao of Physics", 68-69.
Chaneliere, T. et al., "Storage and retrieval of single photons transmitted between remote quantum memories", vol. 438(8), Dec. 2005, pp. 833-836.
Chang, Y. F., "Experimental Tests of the Thought Field, The Extensive Quantum Theory and Quantum Teleportation", The Journal of Religion and Psychical Research.
Erol, "Quantum Entanglement: Fundamentals and Relations with Consciousness/Mind", NeuroQuantology, vol. 8, No. 3, Sep. 2010, pp. 390-402, DOI: 10.14704/nq.2010.8.3.309.
Fusaroli et al., "Timescales of Massive Human Entrainment", PLoS One, vol. 10, No. 4, Apr. 16, 2015, e0122742, 19 pages, https://doi.org/10.1371/journal.pone.0122742.
Gammaitoni, L., "Nonlinear sensors acticviated by noise", vol. 325, Physica A: Statistical Mechanics and its Applications, Jul. 2003.
Gargiulo, "Mind, Meaning, and Quantum Physics: Models for Understanding the Dynamic Unconscious", The Psychoanalytic Review, Feb. 2010, vol. 97, No. 1, pp. 91-106, https://doi.org/10.1521/prev.2010.97.1.91.
Georgiev, "No-go Theorem for Stapp's Quantum Zeno Model of Mind-Brain Interaction", NeuroQuantology, vol. 13, Issue 2, Jun. 2015, pp. 179-189, DOI: 10.14704/nq.2015.13.2.839.
Georgiev et al., "No-Go Theorem for Stapp's Quantum Zeno Model of Mind-Brain Interaction", NeuroQuantology, vol. 13, No. 2, Jun. 2015, pp. 179-189, doi: 10.14704/nq.2015.13.2.839.
Gill et al., "Entrainment and musicality in the human system interface", AI & Society, Jun. 2007, vol. 21, Issue 4, pp. 567-605, DOI 10.1007/s00146-007-0103-8.
Gonze et al., "Stochastic models for circadian oscillations: Emergence of a biological rhythm", International Journal of Quantum Chemistry, vol. 98, Issue 2, Special Issue: Complexity: Microscopic and Macroscopic Aspects, 2004, pp. 228-238, first published Jan. 14, 2004, https://doi.org/10.1002/qua.10875.
Gonze et al., "Stochastic Models of Circadian Oscillations: Emergence of a Biological Rhythm", International Journal of Quantum Chemistry, vol. 98, No. 2, Jan. 14, 2004, pp. 228-238, doi: 10.1002/qua.10875.
Hari, "Mind and Tachyons: Quantum Interactive Dualism—Libet's Causal Anomalies", NeuroQuantology, vol. 12, Issue 2, Jun. 2014, pp. 247-261, DOI: 10.14704/nq.2014.12.2.746.
Hari et al., "Mind and Tachyons: How Tachyon Changes Quantum Potential and Brain Creates Mind", NeuroQuantology, vol. 9, No. 2, Jun. 2011, pp. 255-270, DOI: 10.14704/nq.2011.9.2.320.
Hari et al., "Mind and Tachyons: Quantum Interactive Dualism—Libet's Causal Anomalies", NeuroQuantology, vol. 12, No. 2, Jun. 2014, pp. 247-261, doi: 10.14704/nq.2014.12.2.746.
Jahn, R. G. et al., "On the Quantum Mechanics of Consciousness, with Application to Anomalous Phenomena", vol. 16(8), Foundations of Physics, 1986, pp. 721-772.
Kaku, M., "Parallel Worlds", 2005.
Kal'yanov, E. V., "Interaction between Oscillations in a Self-stochastic System", vol. 45(10), Feb. 16, 2000, 1365-1367.
Letiche, "Self-Organization, Action Theory, and Entrainment: Reflections inspired by Alicia Juarrero's Dynamics in Action", Emergence: Complexity and Organization, vol. 2, Issue 2, 2000, pp. 58-71, https://doi.org/10.1207/S15327000EM0202_04.
Letiche et al., "Self-Organization, Action Theory, and Entrainment: Reflections Inspired by Alicia Juarreno's Dynamics in Action", Emergence: Complexity and Organization, vol. 58, Apr. 2000, 13 pgs.
Libet et al., "Conscious Mind as a Field", Journal of Theoretical Biology, vol. 178, Issue 2, Jan. 21, 1996, pp. 223-224, https://doi.org/10.1006/jtbi.1996.0019.
Liu et al., "Improvements and applications of entrainment control for nonlinear dynamical systems", Chaos, vol. 18, 2008, 043120, 23 pages, https://doi.org/10.1063/1.3029670.
McTaggart, "Sharing Dreams", 2002.
Mori, T. et al., "Stochastic Resonance in Alpha Oscillators in the Human Brain", vol. 12, International Journal of Bifurcation and Chaos (IJBC), 2002, 2631-2639.
Mould, R. A., "Quantum Brain States", vol. 33(4), Foundations of Physics, Apr. 2003, 591-612.
Mtetwa et al., "Precision Constrained Stochastic Resonance in a Feedforward Neural Network", IEEE Transactions on Neural Networks, Jan. 2005, vol. 16, No. 1, pp. 250-262.
Muratov, C. B. et al., "Self-induced stochastic resonance in excitable systems", vol. 210, 2005, 227-240.
Musha et al., "Possibility to Realize the Brain-Computer Interface from the Quantum Brain Model Based on Superluminal Particles", Journal of Quantum Information Science, vol. 1, No. 3, Dec. 2011, pp. 111-115, DOI: 10.4236/jqis.2011.13015.
Nicolelis et al., "Controlling robots with the mind", Scientific American-American Edition—287.4 (2002): 46-55.
Novin, W., "Can Quantum Physics Explain Consciousness?", vol. 11(1), 2004.
Pantaleone, "Synchronization of metronomes", American Journal of Physics, vol. 70, No. 19, Oct. 2002, pp. 992-1000, https://doi.org/10.1119/1.1501118.

(56) References Cited

OTHER PUBLICATIONS

Radin, D. I. et al., "Evidence of Consciousness-Related Anomalies in Random Physical Systems", vol. 19(12), Foundations of Physics, 1989, 1499-1514.

Rein, G., "Bioinformation Within the Biofield: Beyond Bioelectromagnetics", vol. 10(1), The Journal of Alternative and Complementary Medicine, 2004, 59-68.

Roy, P. K., "Stochastic Resonance Imaging—Stochastic Resonance Therapy: Preliminary Studies Considering Brain as Stochastic Processor", vol. 3316, Lecture Notes in Computer Science, 2004, 2 pgs.

Shermer, M., "Digits and Fidgets", vol. 288(1), Scientific American, Jan. 2003, 35.

Shimizu et al., "Quantum Walk Founds Over Dispersion of Field RNG Output: Mind Over Matter Through Quantum Processes", NeuroQuantology, vol. 13, Issue 4, Dec. 2015, pp. 408-412, DOI: 10.14704/nq.2015.13.4.876.

Tiller, W. A. et al., "Can an Aspect of Consciousness be Imprinted into an Electronic Device?", vol. 35(2), Integrative Physiological and Behavioral Science, 2000, 142-163.

Wolf et al., "Towards a Quantum Field Theory of Mind", NeuroQuantology, vol. 9, Issue 3, Sep. 2011, pp. 442-458, doi: 10.14704/nq.2011.9.3.456.

\* cited by examiner

METHOD AND APPARATUS FOR ENTRAINING SIGNALS

CROSS-REFERENCE TO RELATED APPLICATIONS

The current application claims priority to U.S. Provisional Patent Application No. 63/262,871, filed Oct. 21, 2021; the disclosure of which is hereby incorporated by reference in its entirety.

FIELD OF THE INVENTION

The current invention is directed to methods and systems for entraining signals; more specifically, the invention relates to devices that detect the influence of intentionality on entrainment characteristics of a subatomic signal source and methods to make and use such devices.

BACKGROUND OF THE INVENTION

Mind-machine interfaces provide a means of controlling devices using intentionality. A number of research groups have disclosed methods and apparatuses for detecting the influence of the mind on a physical device. In additional methods and apparatuses, the influence of the mind on a randomly-generated signal has been observed by processing a random digital number output by various methods. Examples of such methods and systems may be found, for example, in U.S. Patent Publication No. 2013/0036078; and U.S. Pat. Nos. 9,858,041; 8,423,297; RE44,097; 6,324,558; 6,763,364; and 6,762,605, the disclosures of each of which are incorporated herein by reference in their entireties.

However, electronic signals are inherently difficult to analyze due to the frequency of such signals (e.g., approximately 500-300,000 Hz), which because of the short periodicity, necessitates filters that can omit significant data being generated.

SUMMARY OF THE INVENTION

Many embodiments are directed to methods and an apparatus configured to allow for consecutive and continuous measurement of the effects of consciousness intentionality on a subatomic signal that can then be processed to provide a control output.

In some aspects, the techniques described herein relate to an external consciousness intentionality interface device including a plasma signal source, a clock counter trigger including two comparators, where each comparator is configured to output a logic state, a current sense voltage conditioner in signal communication with the plasma signal source and the clock counter trigger, configured to obtain a current sense voltage from the plasma source and set a current sense voltage bias at or above a minimum response level for each comparator, a clock counter configured to output a discrete clock count based on the output of the clock counter trigger, an application control signal module configured to output an application control metric derived from the coherence characteristics of a configured register size of inputted discrete clock-count values from the clock counter, and a regulatory feedback output module configured to provide regulatory feedback output to the plasma signal source.

In some aspects, the techniques described herein relate to a device, where the plasma signal source includes a neon plasma bulb.

In some aspects, the techniques described herein relate to a device, further including a plasma excitation energy source regulator configured to output a switch control signal to the plasma signal source.

In some aspects, the techniques described herein relate to a device, where the plasma excitation energy source regulator is configurable in frequency and discrete duration or durations of logic states.

In some aspects, the techniques described herein relate to a device, where the plasma excitation energy source regulator is a National Instruments counter-clocking hardware PCIe 6612.

In some aspects, the techniques described herein relate to a device, where the plasma signal source includes a plasma bulb, a DC voltage source, a transistor-output optocoupler switch, and a voltage-dividing resistor network, where the transistor-output optocoupler switch is configured to isolate a switch control signal from the DC voltage source and transmit the switch control signal to the voltage-dividing resistor network, and where the voltage-dividing resistor network reduces DC voltage connected to the plasma bulb.

In some aspects, the techniques described herein relate to a device, where the transistor-output optocoupler switch is a PS2513.

In some aspects, the techniques described herein relate to a device, where the plasma bulb contains a noble gas.

In some aspects, the techniques described herein relate to a device, where the plasma bulb is an NE-2 type neon bulb.

In some aspects, the techniques described herein relate to a device, where the two comparators are contained within an LM219 integrated circuit.

In some aspects, the techniques described herein relate to a device, where the plasma signal source is a plurality of plasma signal sources.

In some aspects, the techniques described herein relate to a method for entraining, by consciousness intentionality, signals from a plasma signal source or plurality of plasma signal sources to generate a control signal for controlling an external device including providing an external consciousness intentionality interface apparatus to the user, where the interface apparatus includes a plasma signal source, a clock counter trigger including two comparators, where each comparator is configured to output a logic state, a current sense voltage conditioner in signal communication with the plasma signal source and the clock counter trigger, configured to obtain a current sense voltage from the plasma source and set a current sense voltage bias at or above a minimum response level for each comparator, a clock counter configured to output a discrete clock count value based on the output of the clock counter trigger, an application control signal module configured to output an application control metric derived from the coherence characteristics of a configured register size of inputted discrete clock-count values from the clock counter, and a regulatory feedback output module configured to provide regulatory feedback output to the plasma signal source, and directing the user to make an intention affected change to a state of an observable stimulus configured to be representative of the trend of the output signal.

In some aspects, the techniques described herein relate to a method, further including processing the intention affected change as a qualified event, and generating a control signal from the qualified event.

In some aspects, the techniques described herein relate to a method, where the control signal directs the operation of an external device in signal communication with the consciousness intentionality interface apparatus.

In some aspects, the techniques described herein relate to a method, where the mind-machine interface apparatus further includes an external device in signal communication with the consciousness intentionality interface apparatus.

In some aspects, the techniques described herein relate to a method, the plasma signal source includes a neon plasma bulb.

In some aspects, the techniques described herein relate to a method, where the interface apparatus further includes a plasma excitation energy source regulator configured to output a switch control signal to the plasma signal source.

In some aspects, the techniques described herein relate to a method, where the plasma signal source includes a plasma bulb, a DC voltage source, a transistor-output optocoupler switch, and a voltage-dividing resistor network, where the transistor-output optocoupler switch is configured to isolate a switch control signal from the DC voltage source and transmit the switch control signal to the voltage-dividing resistor network, and where the voltage-dividing resistor network reduces DC voltage connected to the plasma bulb.

In some aspects, the techniques described herein relate to a method, where the transistor-output optocoupler switch is a PS2513.

In some aspects, the techniques described herein relate to a method, where the two comparators are contained within an LM219 integrated circuit.

In some aspects, the techniques described herein relate to a method, where the plasma signal source is a plurality of plasma signal sources

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
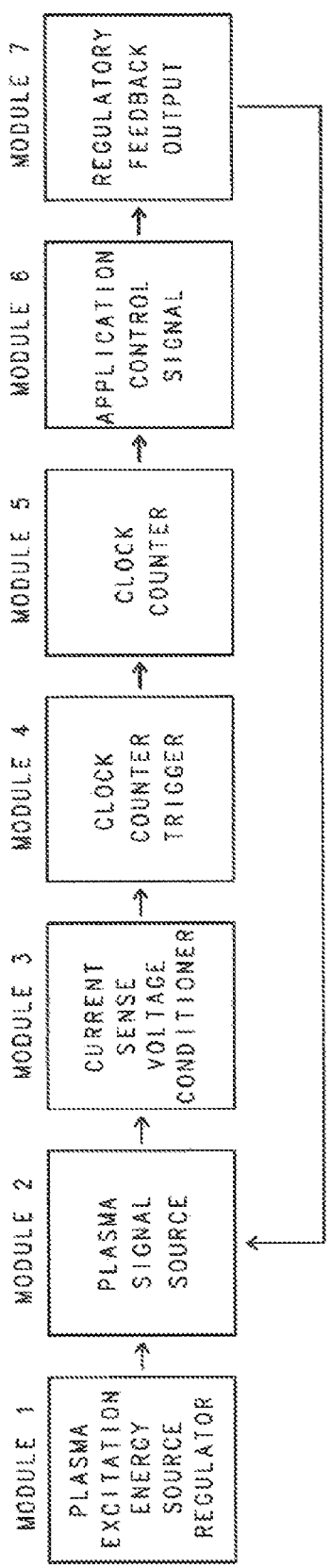
FIG. 1 illustrates a schematic diagram of a signal interface system in accordance with various embodiments of the invention.

Turning now to the data and description, methods and apparatus configured to detect the influence of consciousness intentionality by interfacing with a device-generated signal are provided. Many embodiments entrain signals from one or more subatomic signal sources. In embodiments utilizing multiple subatomic signal sources, these sources can be coupled. Changes in coherence between consciousness intentionality and the one or more subatomic signal sources can be measured by rate of change and other signal characteristics. These changes can be output as discrete measures of the entrained signals (e.g., distribution coherence of discrete values). Additional embodiments provide systems and methods to control an action or other device, including (but not limited to) switches, communication, feedback, intentionality-influenced performance metrics, and mechanical movement.

Turning now to the data and description, methods and devices configured to detect the influence of consciousness intentionality by interfacing with a device-generated signal are provided. Many embodiments entrain signals from one or more subatomic signal sources. In embodiments utilizing multiple subatomic signal sources, these sources can be coupled. Changes in coherence between consciousness intentionality and the one or more subatomic signal sources can be measured by rate of change and other signal characteristics. These changes can be communication, feedback, an intentionality-influenced performance metric, and mechanical movement.

In many such embodiments, the methods and devices incorporate a plasma signal generator, the behavior of which may be influenced by an external signal to provide a control output. Utilizing one or more plasma signals is an advantageous methodology for allowing mind-machine interfacing, due to many advantageous characteristics, including the subatomic dynamics within plasma and use of periodicity of energy discharge allowing for more accurate measurements without the need for filters or other mechanisms to allow for the useful measurement of entrainment.

In various such embodiments, the methods and devices provide a temporal coherence measure influenced by an external signal (e.g., mental intentionality) that improves the ability to discriminate between an ambient state (e.g., where there is no external intentionality or signal) and an intentionality state (e.g., where an external intentionality or intentionality signal is present). In some such embodiments, the methods and devices allow for applications such as switching, communication, feedback, intentionality-influenced performance metrics, and mechanical movement.

Many embodiments allow for the integration and control of an external device to perform a designated task for which a user is required to accomplish. Embodiments allow for user influence and non-contact control of an external device determined by the effect of influence on the plasma signal. Some embodiments allow for the output control of all forms of communication including self-feedback of all available organisms' perceptics. Certain embodiments allow for one or more users to influence the device to control external devices and feedback systems. Finally, some embodiments provide functionality whereby one device with multiple plasma signal nodes in proximity to each other or one another may entrain each other or one another and, via goal-directed programming and feedback control processing, act collectively to accomplish a programmed directive.

Entrainment is a natural phenomenon both in electronics, whereby two or more coupled asynchronous oscillating signals with differing periods and/or phases tend to synchronize, and in biology, whereby two or more asynchronous biological organisms, systems or tissues with differing periods and/or phases will tend to synchronize similar biological characteristics. Biologic entrainment examples include the synchronization of the hand clapping of a crowd, of fireflies flashing, of consensus of thought, and of circadian rhythm. (See, e.g., Fusaroli, R., et. al., Timescales of Massive Human Entrainment, PLOS One, April 2015; Gill, S. P., Entrainment and Musicality in the Human System Interface, AI & Soc., 2007, 21, 567-605; Gonze, D., et. al., Stochastic Models of Circadian Oscillations: Emergence of a Biological Rhythm, International Journal of Quantum Chemistry, 2004, 98(2), 228-238; Letiche, H., Self-Organization, Action Theory, and Entrainment: Reflections Inspired by Alicia Juarreno's Dynamics in Action, Emergence: Complexity and Organization, April 2000, 58; Liu, F., et. al., Improvements and Applications of Entrainment Control for Nonlinear Dynamical Systems, Chaos, 2008, 18, 4, 43120; and Pantaleone, J., Synchronization of Metronomes, American Journal of Physics, 2002, 70, 10, 991-992, the disclosures of which are incorporated herein by reference.) This phenomenon has been known to drive a random system to a more coherent and synchronous state.

Some random generators, generate a random signal at the atomic or sub-atomic level. In turn, quantum theory provides the theoretical foundation and supports an explanation as to why a user (e.g., via mental intentionality) can, in theory, affect specific types of subatomic randomly-generated signals. (See, e.g., Erol, M., Quantum Entanglement, Fundamentals and Relations with Consciousness/Mind, NeuroQuantology, September 2010, 8(3), 390-402; Gargiulo, G., Mind, Meaning and Quantum Physics: Models for Understanding the Dynamic Unconscious, Psychoanalytic Review, February 2010, 97, 1, 91-106; and Har, S. D., Mind and Tachyons: How Tachyon Changes Quantum Potential and Brain Creates Mind, NeuroQuantology, June 11, 9, 2, 255-270, the disclosures of which are incorporated herein by reference.) Specifically, several researchers have established that the mind operates at a quantum level. (See, e.g., Wolf, F. A., Towards a Quantum Field Theory of Mind, NeuroQuantology, September 2011, 9, 3, 442-458; Georgiev, D., No-Go Theorem for Stapp's Quantum Zeno Model of Mind-Brain Interaction, NeuroQuantology, June 15, 13, 2, 179-189; Shimizu, T. & Ishikawa, M., Quantum Walk Founds Over Dispersion of Field RNG Output: Mind Over Matter Through Quantum Processes, NeuroQuantology, December 2015, 13, 4, 408-412; and Libet, B., Conscious Mind as a Field, Journal of Theoretical Biology, 1996, 178, 223-224, the disclosures of which are incorporated herein by reference.) Researchers have gone further to support the quantum-mind interaction by proposing that the mind generates a quantum field that can influence the quantum aspects of mechanical systems. (See, e.g., Hari. S. D., Mind and Tachyons: Quantum Interactive Dualism—Libet's Causal Anomalies, NeuroQuantology, June 14, 12, 2, 247-261; and Musha, T. & Sugiyama, T., Possibility to Realize the Brain-Computer Interface from the Quantum Brain Model Based On Superluminal Particles, Journal of Quantum Information Science, December 2011, 111-118, the disclosures of which are incorporated herein by reference.) Although there are opposing opinions as to whether the quantum interaction of an organism is generated from consciousness, mind, or the brain, the distinction is irrelevant to the operation of embodiments of the device that require only the generation of such interaction.

Present embodiments of methods and devices provide an interface capable of entraining a user's mental intentionality influence to entrain plasma signals such that they can be processed, discriminated, and then outputted to fulfill the objective of user's mental intentionality. In many embodiments, methods and devices use multiple plasma signals that, when coupled together, produce a higher state of synchronization (e.g., coherence). Embodiments of the methods and apparatus also include a temporal processed measure of the coherence change in entrainment beyond an ambient state. Examples of applied measures of changes in entrainment coherence by a user include, but are not limited to, the control of switching, communication, feedback, and movement.

Plasma signal sources are advantageous due to plasma being very sensitive to induced energy. Plasma bulbs and other sources of plasma possess discharge profiles in a process similar to capacitor discharge. Unlike capacitors, plasma source discharge typically has an inconsistent discharge profile. Metrics of a profile can include slope, curve, time to discharge (e.g., time to 25% discharge, time to 50% discharge, time to 75% discharge, time to 90% discharge, time to 95% discharge, time to 100% discharge, etc.), rate of discharge, and/or any other identifiable discharge metric. However, such directly measurable metrics can have limited power, due to the natural inconsistencies in plasma discharge profiles. As such, derived metrics may have more value in characterizing discharge profiles. Derived metrics are metrics or parameters that are not directly measurable, such as measures of variation, including statistical variance, standard deviation, topographic variation, and other forms of variation within the discharge can be identified. Additional derived metrics include second order derivations, such as trends in variation. As plasma discharge is controlled, such as through cycling a power source (i.e., duty cycling), multiple discharge profiles can be obtained and determined for variation. Under the influence of mental intentionality, the derived metrics can change and be identified. For example, while being influence via mental intentionality, standard deviation of one or more metrics can be produced.

In many embodiments, the amount of energy powering the plasma source is controlled by adjusting duty cycle of the power source. Duty cycle in various embodiments refers to the percentage of time "on" a power source (i.e., 0% duty cycle is always "off," 100% duty cycle is always "on," and 50% duty cycle alternates between "on" and "off" with equal amounts of times). In various embodiments, duty cycle is set above a minimum duration at the striking-voltage of the plasma source below which the discharge signals become unstable and below a maximum duration at the striking voltage above which plasma discharge becomes deterministic and non-responsive to mental intention. Specific thresholds can vary depending on specific power and plasma sources. In certain embodiments, the minimum threshold is 4% duty cycle, while the maximum threshold is 90%. Specific embodiments identify specific thresholds depending on the configuration, and some embodiments utilize a duty cycle of approximately 6% to 12% for optimal determination of metrics and derived metrics.

Derived metrics, such as standard deviation, can be biased due to metrics obtained from a control signal (e.g., not under influence) and metrics obtained while a device or system is under the influence of mental intentionality. As such, various embodiments calculate the derived metrics based on a subset of cycles. Such subsets can be obtained as discrete windows of cycles (e.g., cycles 1-5, cycles 6-10, etc.), while some embodiments obtain subsets as a sliding window (e.g., cycles 1-5, cycles 2-6, cycles 3-7, etc.).

While the above describes utilizing plasma discharge profiles, further embodiments can implement spectroscopic measurements or other metrics of the plasma itself. Such metrics can include photon emission information, including intensity, wavelength of light, time to maximum intensity, and any other metric that can change based on mental intentionality. Some such embodiments can further utilize secondary or indirect measurements, such as if the direct measurements are too small or are too difficult to detect. Secondary or indirect measurements include use of a cofactor that produces a measurable metric upon excitation of the plasma. For example, the use of a fluorescent compound (e.g., luminol) can be used as a photonic source of measurement in situations where the plasma emits photons outside of a detectable range. Furthermore, derived metrics (such as variation metrics and others as described herein) can be utilized for photonic emissions in such embodiments.

Further embodiments can utilize inductive characteristics of a plasma source. Plasma emits an electromagnetic field (EMF) from the plasma source. Metrics can be derived from measurements of the EMF field intensity during all phases of plasma source excitation and discharge.

Embodiments of Interface Devices

Figure 3:
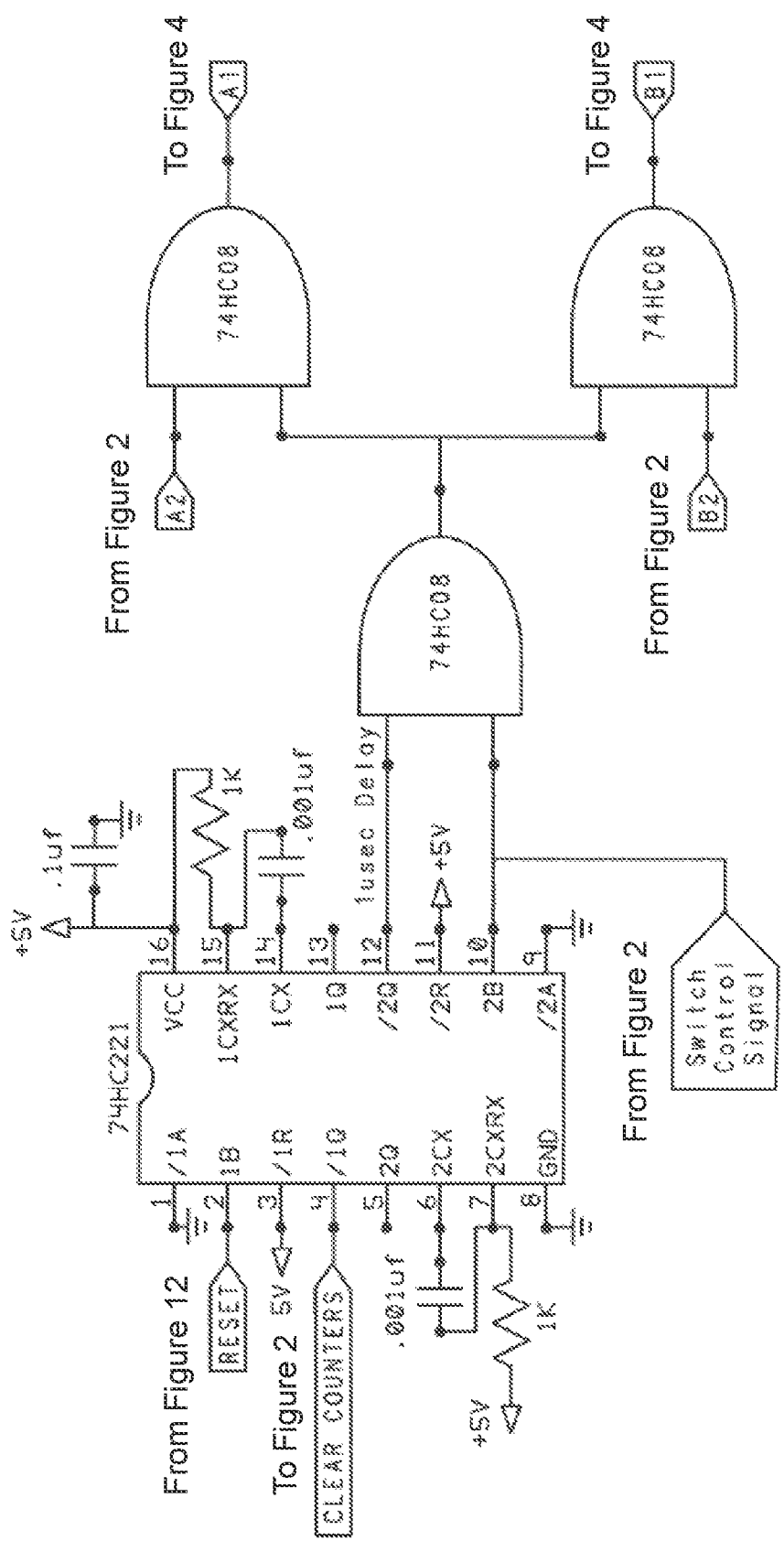
FIG. 3 provides a circuit diagram of the second of two stages of a transistor-output optocoupler switch control circuit in accordance with various embodiments of the invention.
Figure 4:
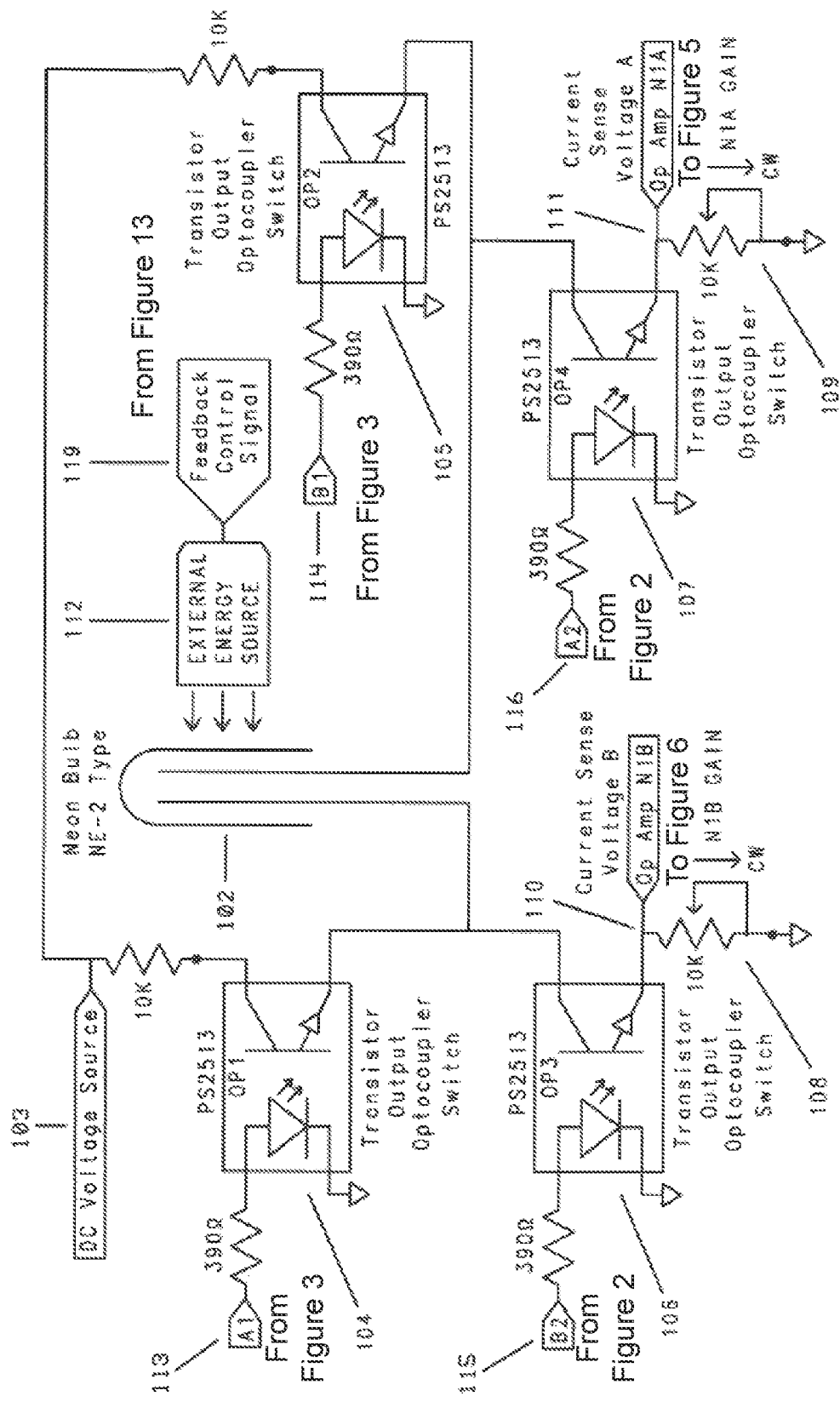
FIG. 4 provides a circuit diagram of a Plasma Signal Source in accordance with various embodiments of the invention.

Turning to the figures, as shown in FIG. 1, the methods and apparatus utilize a multiple module system. In many embodiments, Module 1 provides a plasma excitation energy source regulator. In many embodiments, the plasma excitation energy source regulator outputs a switch control signal (FIG. 2, 101) to regulate a DC Voltage Source (FIG. 4, 103) by switching a control circuit (FIGS. 2 and 3) to switch one or more transistor output optocoupler switches (FIG. 4, 104, 105, 106, 107). In some embodiments, the plasma excitation energy source regulator is configurable in frequency and discrete duration or durations of logic states. Embodiments may use any clock counter suitable for regulating a plasma excitation energy source regulator. As a non-limiting example, certain embodiments utilize a National Instruments counter-clocking hardware PCIe 6612 device as the plasma excitation energy source regulator.

Module 2 of many embodiments provides a plasma signal source. As illustrated in FIG. 4, a plasma bulb (102) is a source of subatomic ionized energy, malleable by mental intentionality. Many suitable plasma sources can be used in embodiments. In some embodiments, the plasma source is enclosed (e.g., a bulb), including metal, non-porous polymer, ceramic, quartz, and/or glass enclosures. While opaque enclosures can allow for the measurement of discharge, transparent or translucent enclosures can allow for excitation, by coupled external energy sources, (e.g., photonic stimulation) and measurement of plasma's optical features (e.g., wavelength, brightness, etc.). In various embodiments, a plasma bulb contains a noble gas. In some embodiments, the noble gas is selected from helium, argon, krypton, xenon, neon, radon, and combinations thereof. A non-limiting example of a suitable plasma bulb (102) is a NE-2 type neon plasma bulb. Further embodiments include a DC voltage source (103). In some embodiments, the DC voltage source (103) exceeds the plasma bulb's (102) striking voltage, with, or independent of, an external coupled energy source (112). Some embodiments further include one or more transistor output optocoupler switches (104, 105, 106, 107) that isolate Switch Control Signals (113, 114, 115, 116) from the DC voltage source (103).

As illustrated in FIG. 4, some embodiments utilize four transistor output optocoupler switches (104, 105, 106, 107). In this example:

When the transistor-output optocoupler switch (104) is switched on, it connects the DC voltage source (103) to the plasma bulb (102).

When the transistor-output optocoupler switch (107) is switched on, it provides a path for discharge current to ground through resistor (109).

When the transistor-output optocoupler switch (105) is switched on, it connects the DC voltage source (103) to the plasma bulb (102).

When the transistor-output optocoupler switch (106) is switched on, it provides a path for discharge current to ground through resistor (108).

Various embodiments can utilize any suitable transistor-output optocoupler switch, while in this non-limiting example, the transistor-output optocoupler switches (104, 105, 106, 107) are a PS2513. Additional embodiments include one or more adjustable current-sense resistors (108, 109) that configure the Current Sense Voltages (110, 111) to provide an optimum resolution of the plasma's discharging energy detected with Modules 2, 3 & 4.

Figure 5:
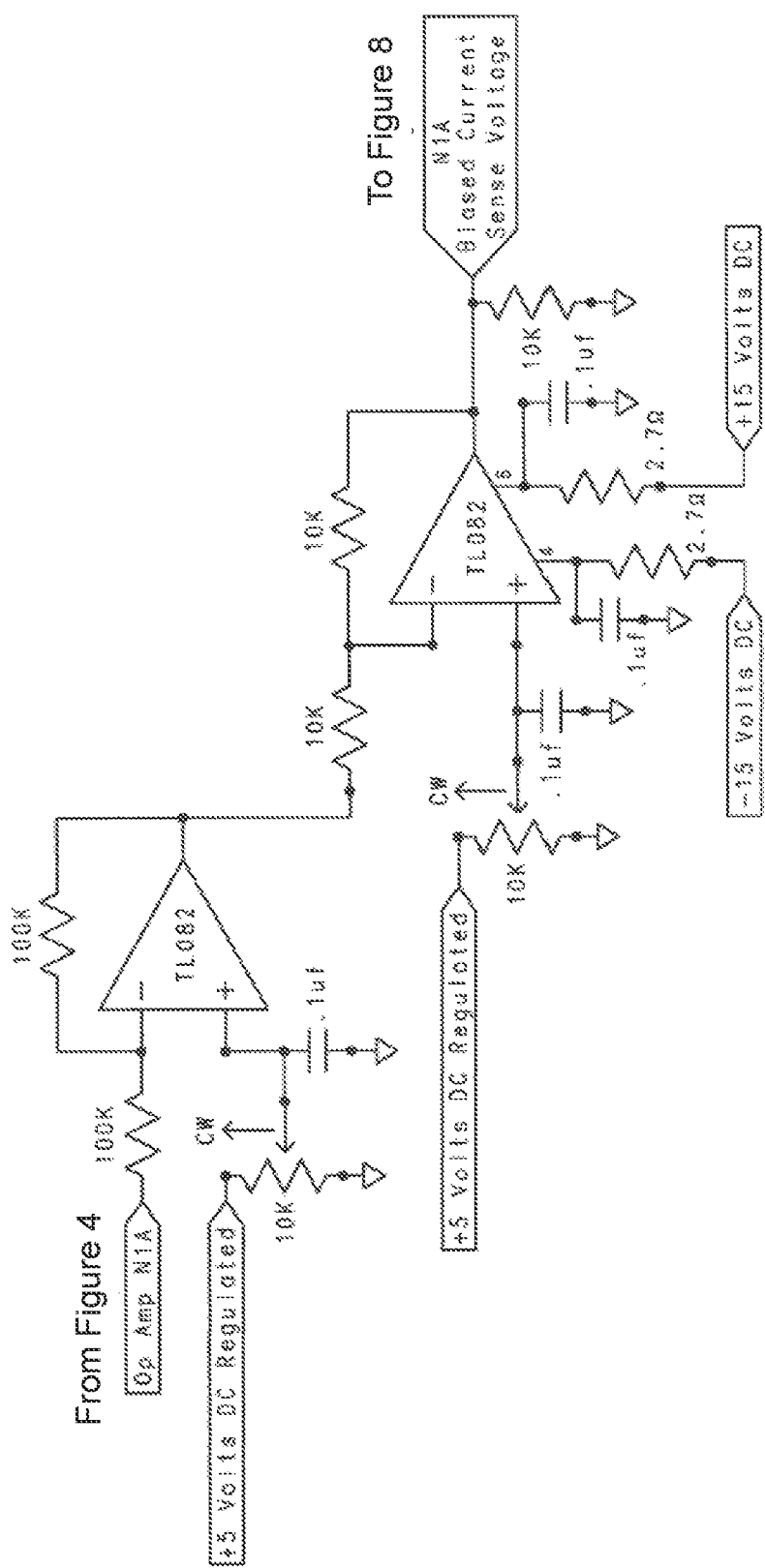
FIG. 5 provides a circuit diagram of the first of two Current Sense Voltage Conditioners in accordance with various embodiments of the invention.
Figure 6:
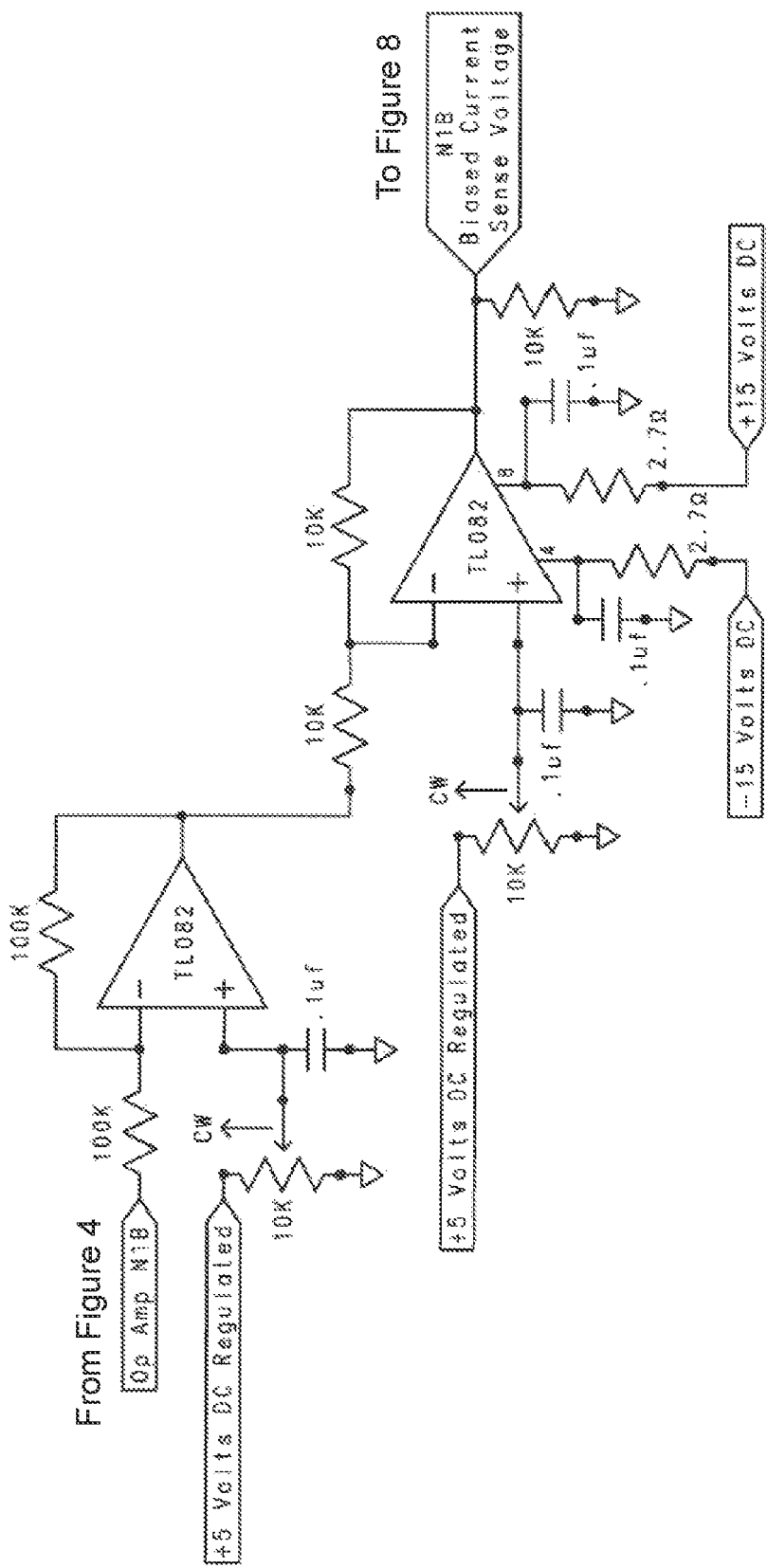
FIG. 6 provides a circuit diagram of the second of two Current Sense Voltage Conditioners in accordance with various embodiments of the invention.
Figure 7:
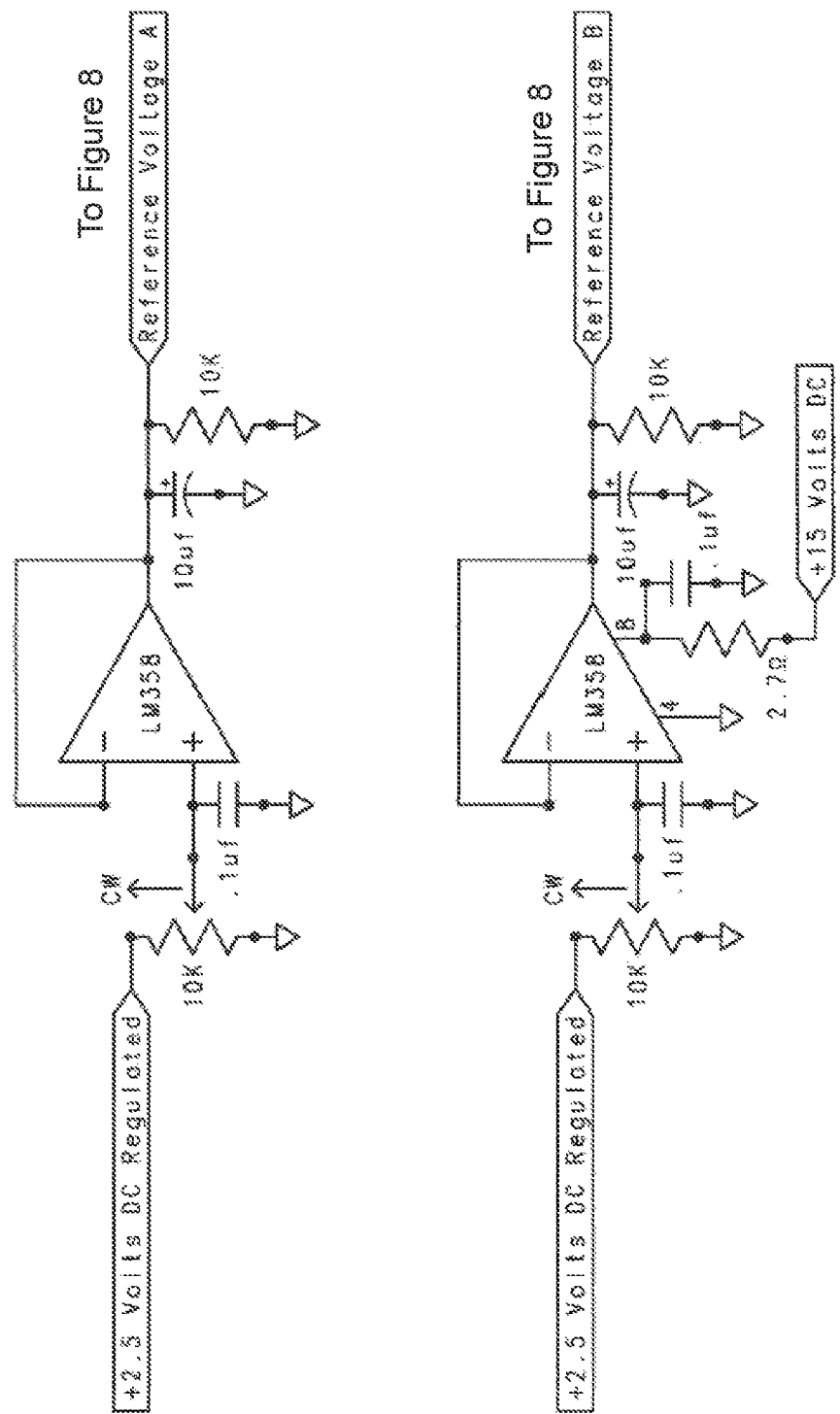
FIG. 7 provides a circuit diagram of two circuits that configure the Reference Voltages in accordance with various embodiments of the invention.

Turning to FIGS. 5-6, exemplary circuits used in a current sense voltage conditioner are illustrated (e.g., FIG. 1, Module 3). Specifically, FIGS. 5-6 illustrate circuits that sets the Current Sense Voltage biases at or above the minimum response level of each comparator (e.g., FIG. 8, LM219). Additionally, FIG. 7 illustrates exemplary circuits that configure the Reference Voltage at each comparator's input in FIG. 8, LM219.

Figure 8:
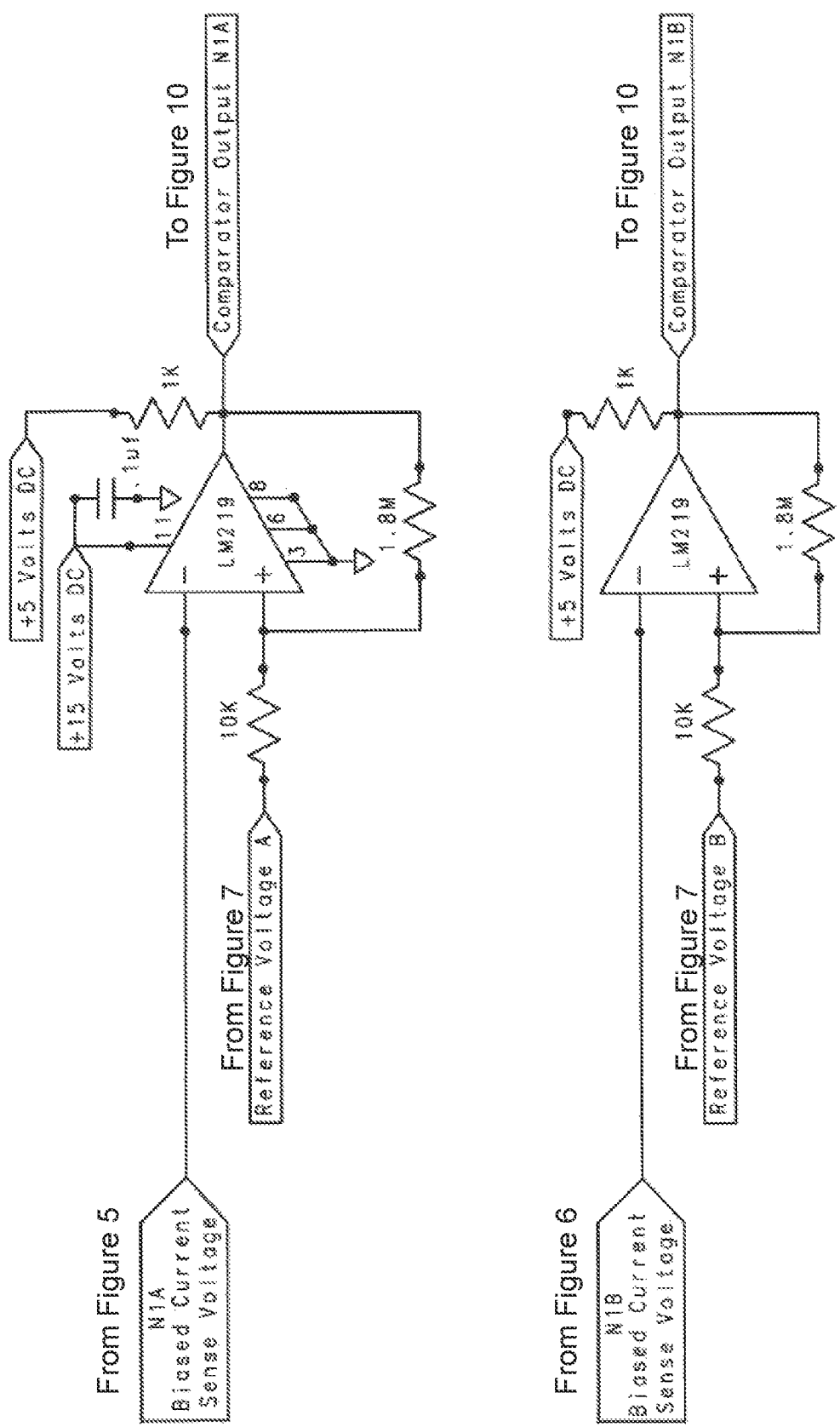
FIG. 8 provides a circuit diagram of a dual comparator in accordance with various embodiments of the invention.
Figure 9:
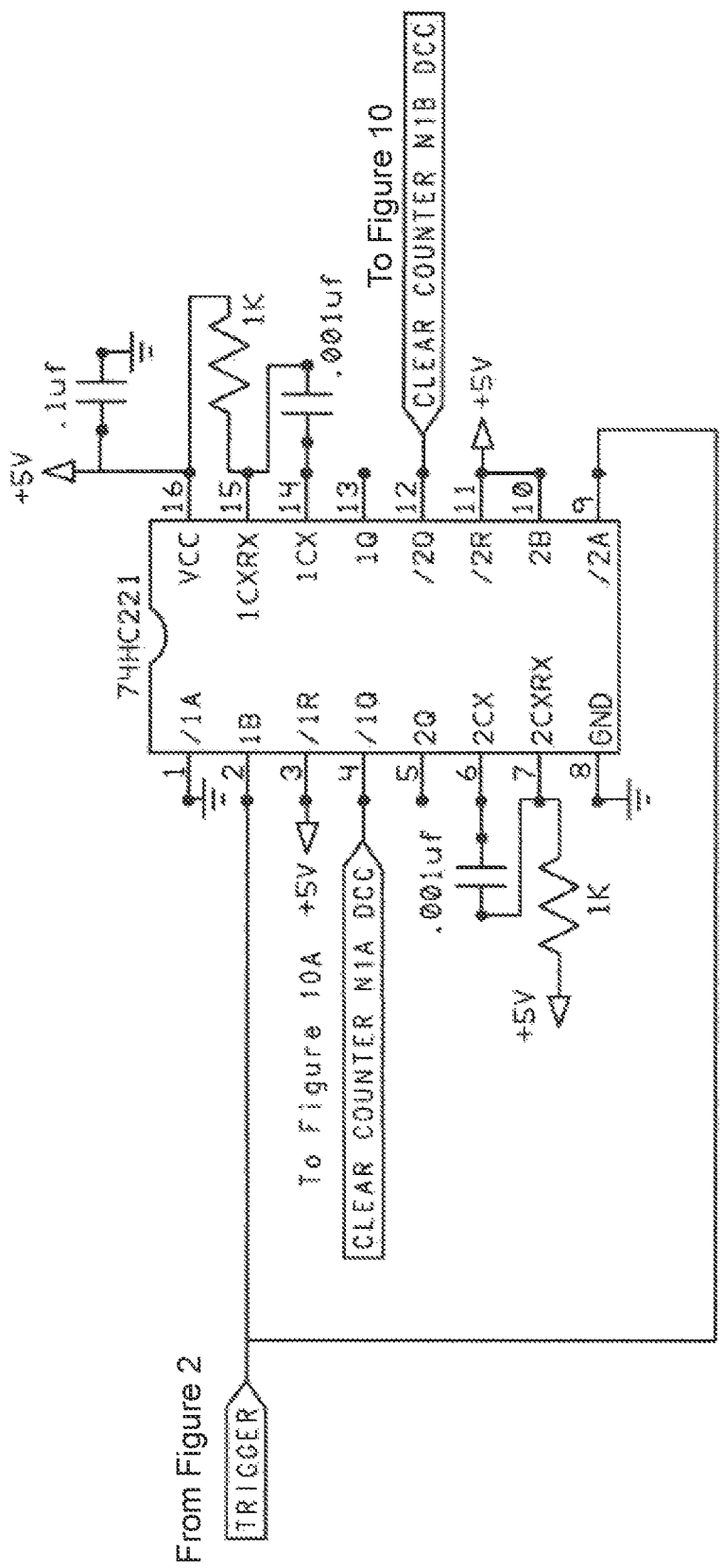
FIG. 9 provides a circuit diagram of the first of two stages of a Discrete Clock Count (DCC) Reference Signal circuit in accordance with various embodiments of the invention.
Figure 10:
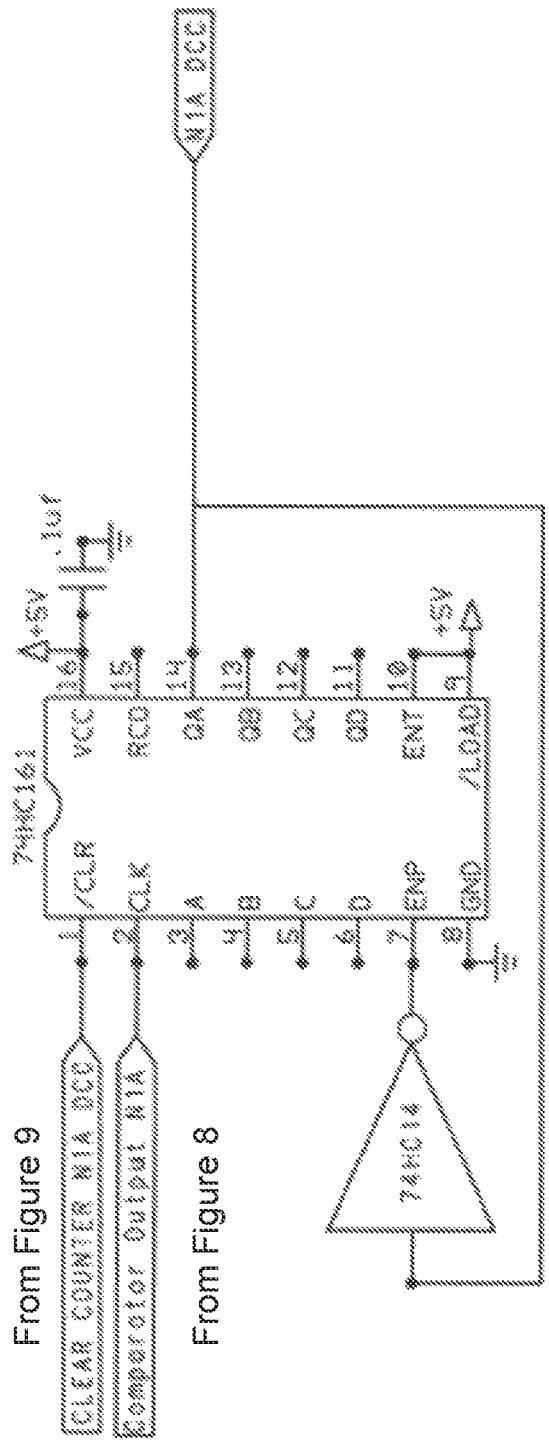
FIG. 10 provides a circuit diagram of the second of two stages of a Discrete Clock Count (DCC) Reference Signal circuit in accordance with various embodiments of the invention.
Figure 10:
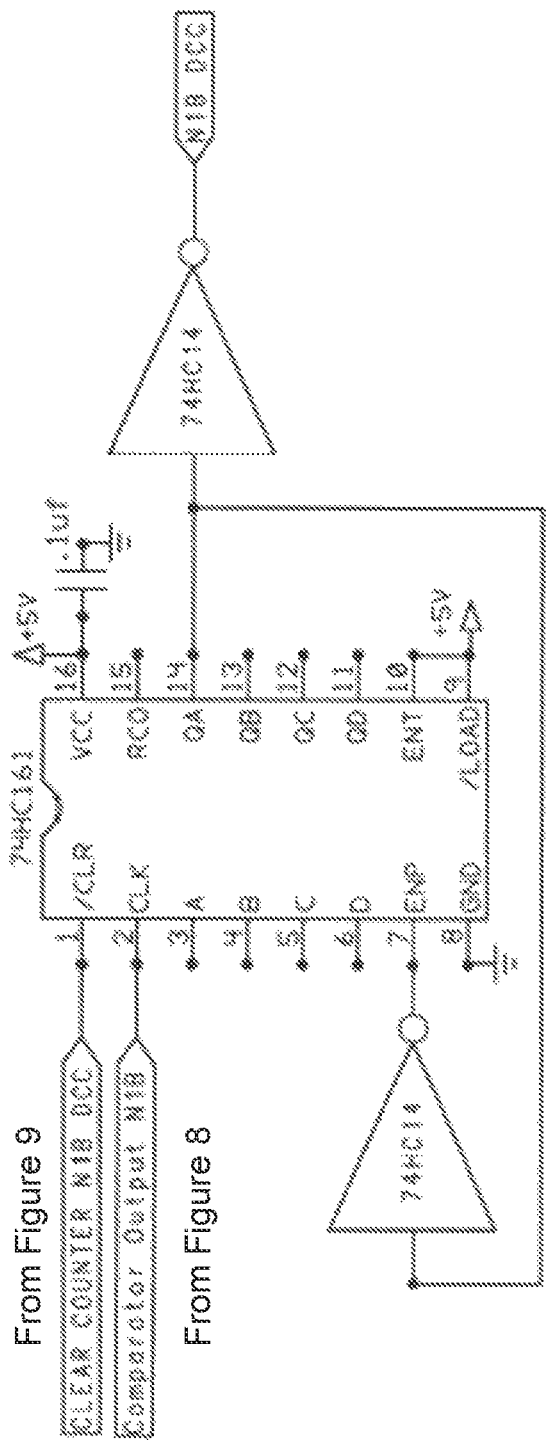

FIGS. 8-10 illustrate exemplary circuits used in conjunction with a clock counter trigger (e.g., FIG. 1, Module 4). FIG. 8 illustrates an exemplary circuit using two comparators, wherein each comparator outputs a logic state when the Biased Current Sense Voltage surpasses its configured Reference Voltage. Some specific embodiments utilize an LM219 as a dual comparator. FIG. 9 illustrates an exemplary circuit that responds to the rising and falling edge of the TRIGGER signal from FIG. 2 to clear the counters in FIG. 10. The Discrete Clock Counter (DCC) Trigger for N1A DCC begins on the rising edge of the TRIGGER signal from FIG. 2 and ends on the rising edge of the N1A DCC signal. The Discrete Clock Counter (DCC) Trigger for N1B DCC begins on the falling edge of the TRIGGER signal from FIG. 2 and ends on the falling edge of the N1B DCC signal. While many suitable components can be utilized in accordance with certain embodiments, a non-limiting example of the one-shot in FIG. 9 is a 74HC221 integrated circuit. While many suitable components can be utilized in accordance with certain embodiments, a non-limiting example of the counters in FIG. 10 are 74HC161 integrated circuits.

Figure 2:
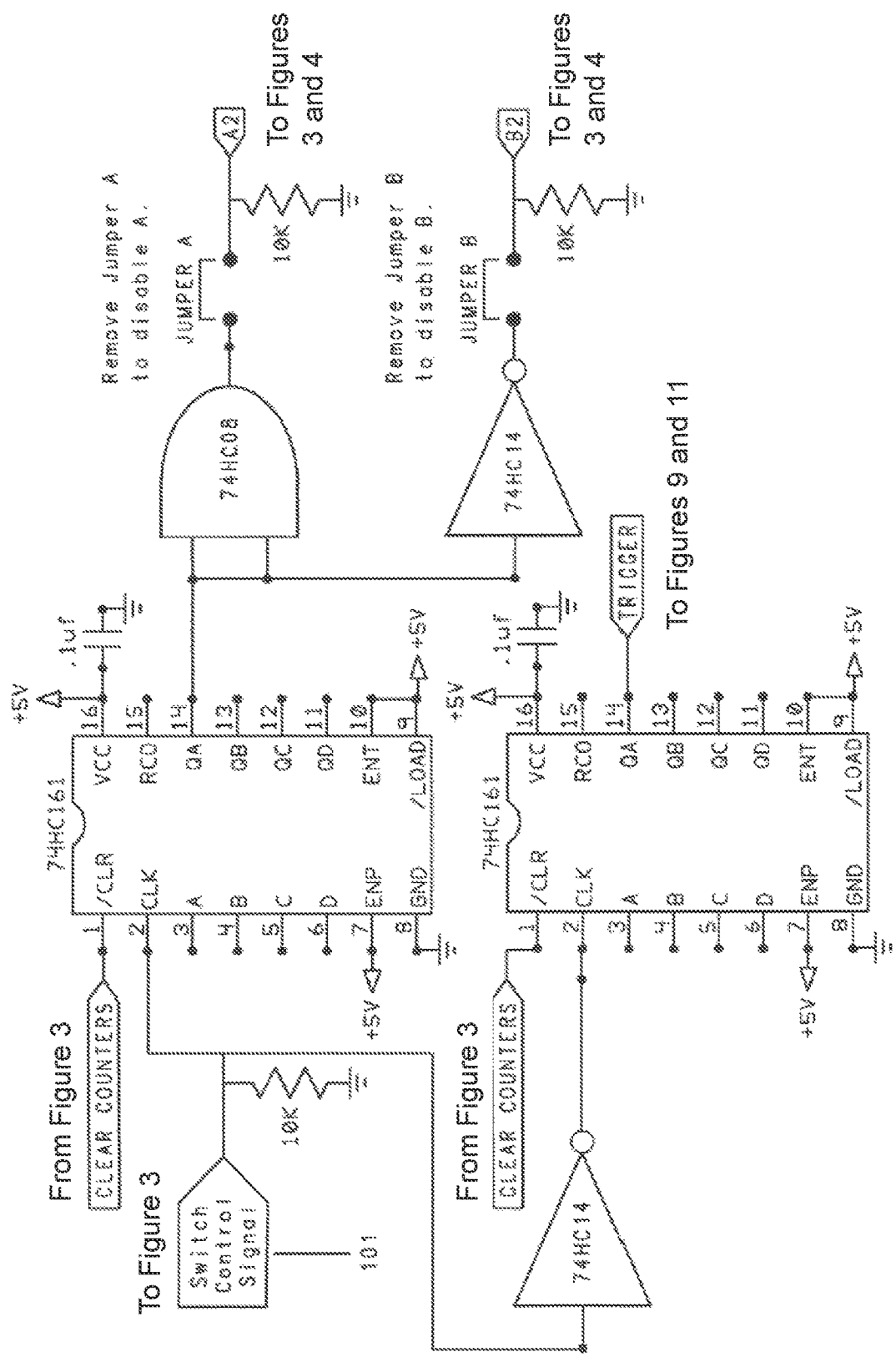
FIG. 2 provides a circuit diagram of the first of two stages of a transistor-output optocoupler switch control circuit in accordance with various embodiments of the invention.
Figure 11:
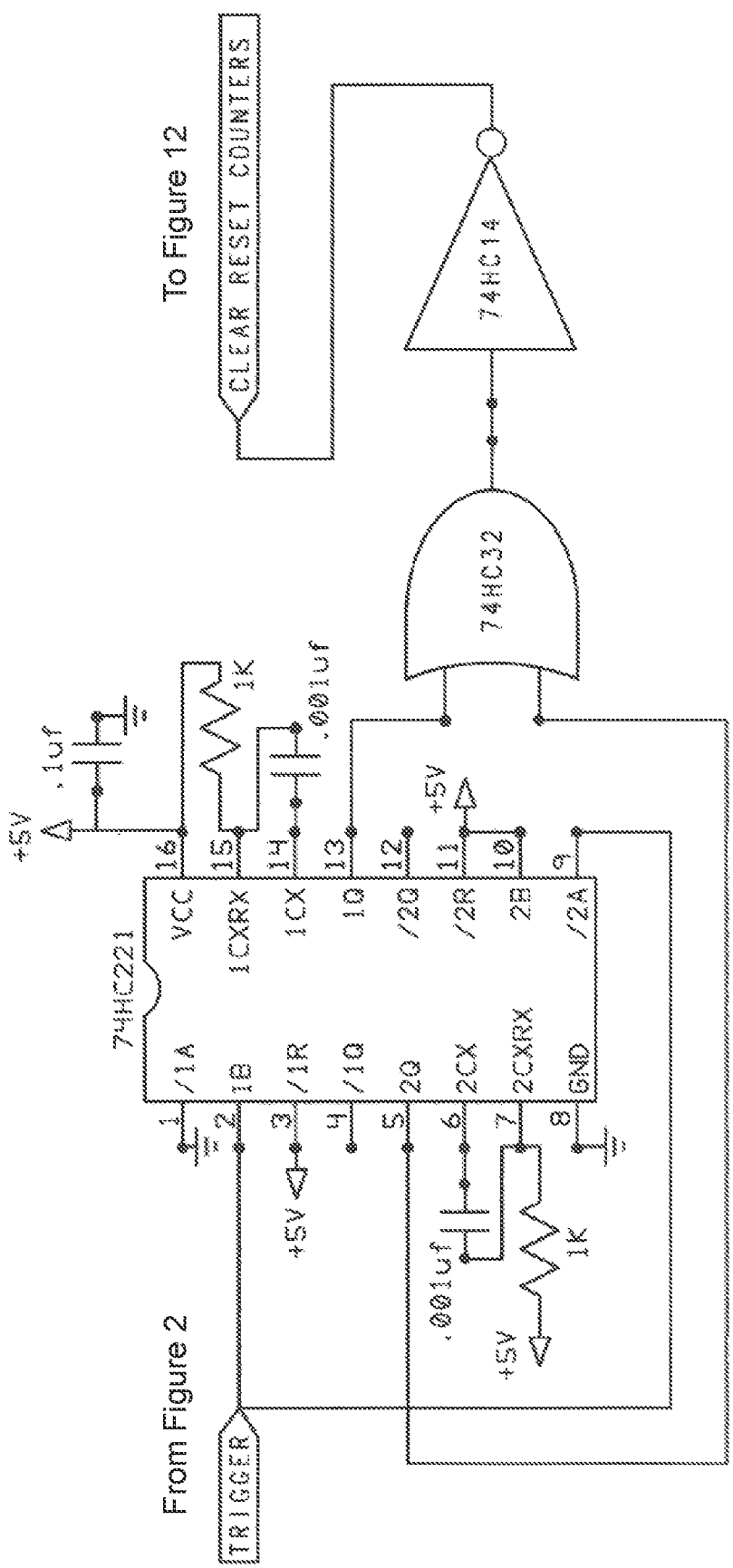
FIG. 11 provides a circuit diagram of the first stage of a Counter-Reset circuit in accordance with various embodiments of the invention.
Figure 12:
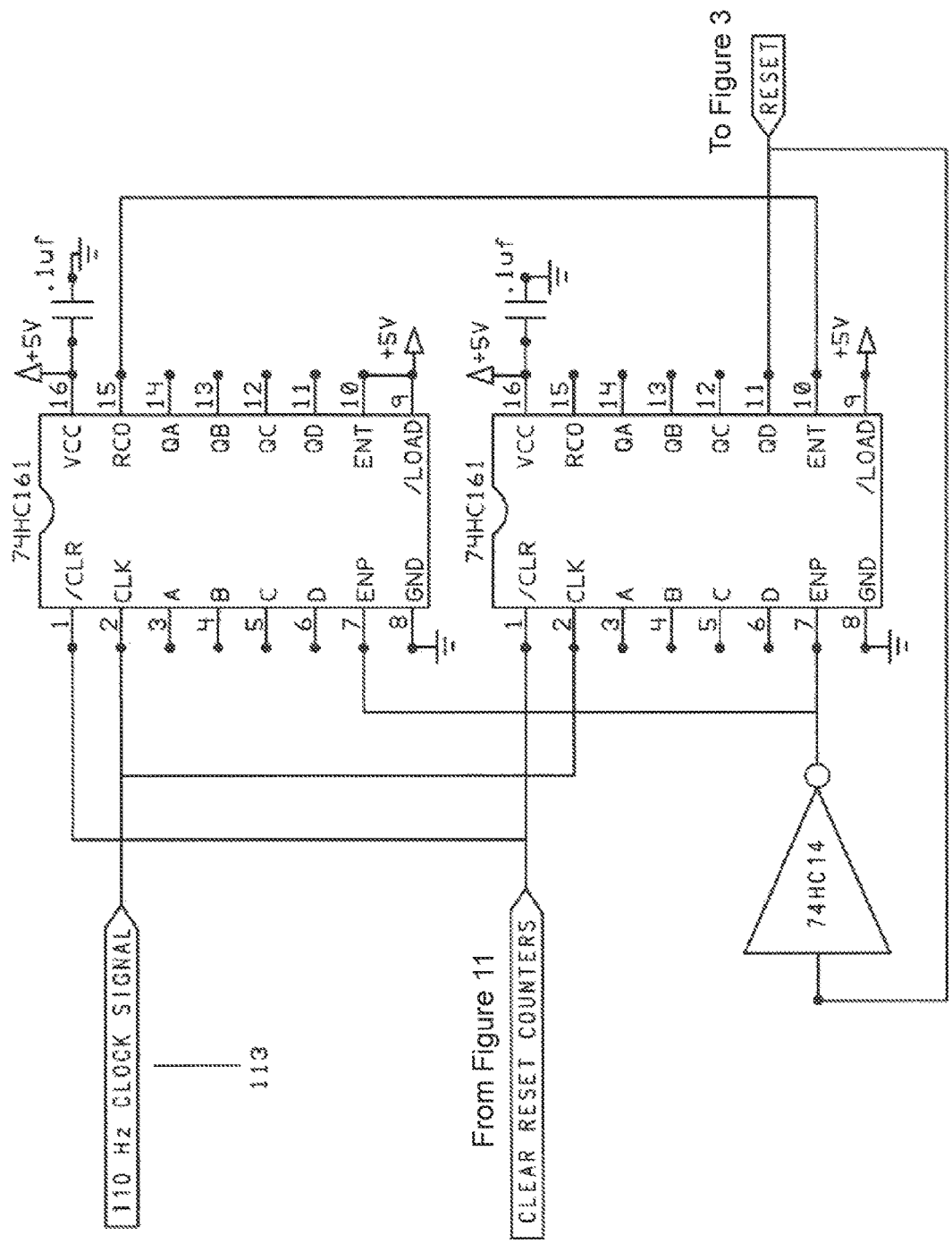
FIG. 12 provides a circuit diagram of the second stage of a Counter-Reset circuit in accordance with various embodiments of the invention.

FIGS. 11-12 illustrate exemplary circuits that reset the counters in FIG. 2 to a cleared state whenever the Switch Control Signal, (FIG. 2, 101) is absent for a designated period of time (e.g., 110 Hz CLOCK SIGNAL, FIG. 12, 113 divided by 128 equals 0.86 seconds). This RESET circuitry ensures relational accuracy with respect to the rising and falling edges of the TRIGGER signal in FIG. 2 and the N1A DCC and N1B DCC outputs in FIG. 10. While many suitable components can be utilized in accordance with certain embodiments, a non-limiting example of the one-shot in FIG. 11 is a 74HC221 integrated circuit. While many suitable components can be utilized in accordance with certain embodiments, a non-limiting example of the counters in FIG. 12 are 74HC161 integrated circuits.

Many embodiments include a clock counter (e.g., FIG. 1, Module 5). In certain embodiments, a Discrete Clock Counter Trigger inputs to a clock-counter to output a discrete count value. Certain embodiments utilize a National Instruments counter-clocking hardware PCIe 6612 as the clock counter. Within some embodiments the discrete clock count value is the number of clock-counts between two discretely measured current sense voltages. However, additional embodiments utilize one or more of the following methods to measure changes in plasma characteristics including, laser interferometry and measurements of induction or capacitance, or the direct measure of the effect of the plasma on its physical containment.

Further embodiments include an application control signal (e.g., FIG. 1, Module 6). In certain embodiments, an application control signal represents a configured register size of inputted discrete clock-count values whose register values are consecutively and continuously streaming as a first-in, first-out sequence. In some embodiments, a register of discrete values is processed to discriminate unique data set characteristics from which application control metrics are derived. In some specific embodiments an application control metric is derived from a plasma signal source. An application control metric can also be derived from a plurality of signal sources simultaneously, e.g., an application control metric using interferometry wherein the laser passes through a plurality of plasma signal sources. In certain embodiments, two or more application control metrics derived from a plurality of plasma signal sources are differentially processed to produce discrete application control values. In some embodiments, a single application value or sets of differentially processed application control values are used as axial and planar coordinate controls.

Additional embodiments include a Regulatory Feedback Output (e.g., FIG. 1, Module 7). In many embodiments, Module 7 represents several submodules to provide the regulatory feedback output. Certain embodiments include one or more of:

A decision-making algorithm that integrates relationships between the application control metric output, mental intentionality's level of application engagement metric, and the engagement reference metric, outputting to the clock counter device, engagement signal configuration parameters.

A decision-making algorithm integrating the relationships between the application control metric output, mental intentionality's application performance metric, and the performance reference metric, outputting to the clock counter device, performance signal configuration parameters.

A decision-making algorithm that integrates parameters, such as those noted above, and outputs to the clock counter device, performance signal configuration parameters.

Figure 13:
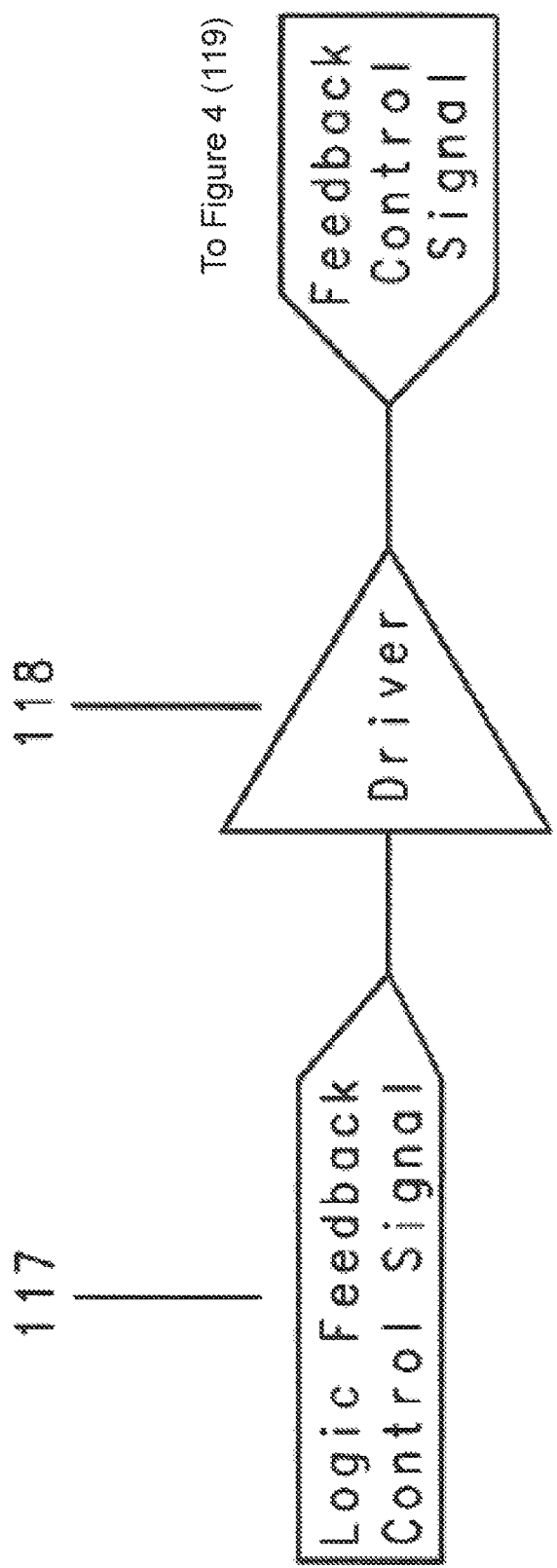
FIG. 13 provides a diagram of how to produce a feedback control signal in accordance with various embodiments of the invention.

In certain embodiments, the clock counter device configuration parameters include signal frequency, duration, and temporal delay from frequency trigger start. Additional parameters can be used, including analog amplitude and amplitude modulation, in addition to frequency, duration and temporal delay from frequency trigger start. Additional embodiments can control an external energy sources in frequency of the energy source itself, e.g., changing from a LED/laser red to LED/laser infrared energy. In some embodiments, the configuration parameters configure the clock counter hardware that then outputs a logic feedback control signal (FIG. 13, 117). In various embodiments, a logic feedback control signal (FIG. 13, 117) outputs to a driver (FIG. 13, 118) that outputs the feedback control signal (FIG. 13, 119) to (FIG. 4, 119). In some embodiments, other external energy sources include the plasma bulbs themselves and how these sources may create synergistic resonance from consciousness intentionality.

Additional details regarding the circuits and processing may be found in U.S. Pat No. 11,181,981 (application Ser. No. 15/993,348; issued Nov. 23, 2021), which is hereby incorporated by reference in its entirety.

Methods of Entraining Mental Intentionality

Figure 14:
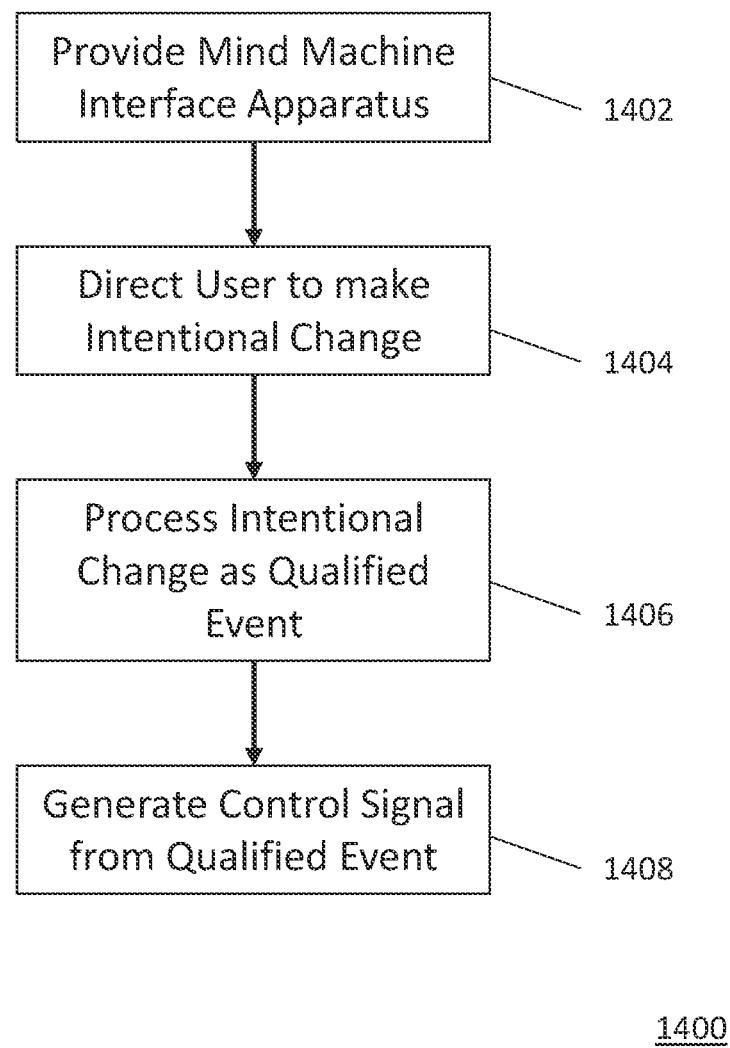
FIG. 14 provides a flow diagram of a method of entraining, by consciousness intentionality, a subatomic signal in accordance with various embodiments of the invention.

Turning now to FIG. 14, various embodiments are directed to a method 1400 to entrain an external influence (e.g., a user's mental intentionality) using a device or apparatus as described above. In such embodiments, an interface apparatus as described above may be provided to a user at 1402. At 1404, the user may further be directed to make an intentional change to a state of an observable stimulus configured to be representative of the trend output signal in embodiments of an interface apparatus as described herein. As noted previously, such control can include switching, communication, feedback, and movement of an object or (as applicable) to an individual.

In many embodiments, the mental intentional change may further be processed as a qualified event at 1406. As described above, such changes can be identified based on the changes to the plasma discharge and/or visual effects of a plasma. At 1408, further embodiments generate a control signal from the qualified event. Such control signals may be used by some embodiments to control an external device which is in signal communication with the interface apparatus.

DOCTRINE OF EQUIVALENTS

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. An external consciousness intentionality interface device comprising:
    a plasma signal source;
    a clock counter trigger comprising two comparators, wherein each comparator is configured to output a logic state;

a current sense voltage conditioner in signal communication with the plasma signal source and the clock counter trigger, configured to obtain a current sense voltage from the plasma source and set a current sense voltage bias at or above a minimum response level for each comparator;

a clock counter configured to output a discrete clock count based on the output of the clock counter trigger;

an application control signal module configured to output an application control metric derived from the coherence characteristics of a configured register size of inputted discrete clock-count values from the clock counter; and a regulatory feedback output module configured to provide regulatory feedback output to the plasma signal source.

2. The device of claim 1, wherein the plasma signal source comprises a neon plasma bulb.

3. The device of claim 1, further comprising a plasma excitation energy source regulator configured to output a switch control signal to the plasma signal source.

4. The device of claim 3, wherein the plasma excitation energy source regulator is configurable in frequency and discrete duration or durations of logic states.

5. The device of claim 3, wherein the plasma excitation energy source regulator is a National Instruments counter-clocking hardware PCIe 6612.

6. The device of claim 1, wherein the plasma signal source comprises:
   a plasma bulb;
   a DC voltage source;
   a transistor-output optocoupler switch; and
   a voltage-dividing resistor network;
   wherein the transistor-output optocoupler switch is configured to isolate a switch control signal from the DC voltage source and transmit the switch control signal to the voltage-dividing resistor network; and
   wherein the voltage-dividing resistor network reduces DC voltage connected to the plasma bulb.

7. The device of claim 6, wherein the transistor-output optocoupler switch is a PS2513.

8. The device of claim 6, wherein the plasma bulb contains a noble gas.

9. The device of claim 6, wherein the plasma bulb is an NE-2 type neon bulb.

10. The device of claim 1, wherein the two comparators are contained within an LM219 integrated circuit.

11. The device of claim 1, wherein the plasma signal source is a plurality of plasma signal sources.

12. A method for entraining, by consciousness intentionality, signals from a plasma signal source or plurality of plasma signal sources to generate a control signal for controlling an external device comprising:
   providing an external consciousness intentionality interface apparatus to the user, wherein the interface apparatus comprises:
      a plasma signal source;
      a clock counter trigger comprising two comparators, wherein each comparator is configured to output a logic state;
      a current sense voltage conditioner in signal communication with the plasma signal source and the clock counter trigger, configured to obtain a current sense voltage from the plasma source and set a current sense voltage bias at or above a minimum response level for each comparator;
      a clock counter configured to output a discrete clock count value based on the output of the clock counter trigger;
      an application control signal module configured to output an application control metric derived from the coherence characteristics of a configured register size of inputted discrete clock-count values from the clock counter; and
      a regulatory feedback output module configured to provide regulatory feedback output to the plasma signal source; and
   directing the user to make an intention affected change to a state of an observable stimulus configured to be representative of the trend of the output signal.

13. The method of claim 12, further comprising:
   processing the intention affected change as a qualified event; and
   generating a control signal from the qualified event.

14. The method of claim 13, wherein the control signal directs the operation of an external device in signal communication with the consciousness intentionality interface apparatus.

15. The method of claim 12, wherein the mind-machine interface apparatus further comprises an external device in signal communication with the consciousness intentionality interface apparatus.

16. The method of claim 12, the plasma signal source comprises a neon plasma bulb.

17. The method of claim 12, wherein the interface apparatus further comprises a plasma excitation energy source regulator configured to output a switch control signal to the plasma signal source.

18. The method of claim 12, wherein the plasma signal source comprises:
   a plasma bulb;
   a DC voltage source;
   a transistor-output optocoupler switch; and
   a voltage-dividing resistor network;
   wherein the transistor-output optocoupler switch is configured to isolate a switch control signal from the DC voltage source and transmit the switch control signal to the voltage-dividing resistor network; and
   wherein the voltage-dividing resistor network reduces DC voltage connected to the plasma bulb.

19. The method of claim 18, wherein the transistor-output optocoupler switch is a PS2513.

20. The method of claim 12, wherein the two comparators are contained within an LM219 integrated circuit.

* * * * *